US007721116B2

(12) United States Patent
Miyoshi et al.

(10) Patent No.: US 7,721,116 B2
(45) Date of Patent: May 18, 2010

(54) SECURITY SYSTEM

(75) Inventors: Takao Miyoshi, Tokyo (JP); Akio Setsumasa, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 1192 days.

(21) Appl. No.: 11/280,358

(22) Filed: Nov. 17, 2005

(65) Prior Publication Data
US 2006/0080558 A1 Apr. 13, 2006

Related U.S. Application Data

(62) Division of application No. 10/021,027, filed on Dec. 19, 2001.

(51) Int. Cl.
*G06F 11/30* (2006.01)
(52) U.S. Cl. .................. 713/193; 380/264; 711/164
(58) Field of Classification Search .................. None
See application file for complete search history.

(56) References Cited

U.S. PATENT DOCUMENTS

| | | | |
|---|---|---|---|
| 5,058,162 A | 10/1991 | Santon et al. | |
| 5,790,664 A | 8/1998 | Coley et al. | |
| 5,802,175 A | 9/1998 | Kara et al. | |
| 5,933,497 A | 8/1999 | Beetcher et al. | |
| 5,940,507 A | 8/1999 | Cane et al. | |
| 6,055,503 A | 4/2000 | Horstmann | |
| 7,089,427 B1 * | 8/2006 | Takata et al. | 713/193 |
| 7,237,123 B2 * | 6/2007 | LeVine et al. | 713/193 |
| 7,362,862 B2 * | 4/2008 | Schneier et al. | 380/251 |

FOREIGN PATENT DOCUMENTS

| | | |
|---|---|---|
| EP | 0919960 A1 | 6/1999 |
| EP | 0 991 007 | 4/2000 |
| EP | 0 998 966 A2 | 5/2000 |
| EP | 0 998 966 A3 | 5/2000 |
| EP | 1 016 960 | 7/2000 |
| EP | 1 217 497 | 6/2002 |
| GB | 2 293 529 A | 3/1996 |

(Continued)

OTHER PUBLICATIONS

"Playstation 2", Internet Citation [Online] 2000, XP003002492, Retrieved from Internet Dec. 8, 2006 (10 pages).

(Continued)

*Primary Examiner*—Pramila Parthasarathy
(74) *Attorney, Agent, or Firm*—Finnegan, Henderson, Farabow, Garrett & Dunner, LLP

(57) ABSTRACT

Provided is a security system for managing which CD-ROM is used for a game device not having identifying information in advance. When a game device accesses a server via a communication network, a device ID, which is issued from the server, is stored in a nonvolatile memory This device ID is generated based on the time and date when the game device accesses the server via a communication network (e.g. Dec. 10, 2000 at 21:05:37). The server associates a serial number (SN) of a CD-ROM used in the game device and a device ID of the game device with each other and registers them on a database. This makes it possible to manage which CD-ROM is used in each game device.

5 Claims, 7 Drawing Sheets

FOREIGN PATENT DOCUMENTS

| | | |
|---|---|---|
| JP | 63-195754 A | 8/1988 |
| JP | 2000-35885 | 2/2000 |
| JP | 2000-157724 | 6/2000 |
| JP | 2000-176176 | 6/2000 |
| JP | 2000-347945 | 12/2000 |
| WO | WO-00/58859 | 10/2000 |
| WO | WO-00/72119 A2 | 11/2000 |

OTHER PUBLICATIONS

European Patent Office Search Report dated Oct. 8, 2007.

Notice of Reasons for Refusal mailed by the Japanese Patent Office on Dec. 7, 2006, in Japanese application No. 2000-387833 and English translation of the Notice.

European Search Report dated Oct. 9, 2006, from the European Patent Office in European Patent Application No. 06014361.7-2224.

Decision to refuse a European Patent application mated Jul. 28, 2006, from the European Patent Office in European Patent Application No. 01310428.6-2224.

Office Action from European Patent Office mailed on Mar. 9, 2005, in European Patent Application No. 01310428.6-2212.

\* cited by examiner

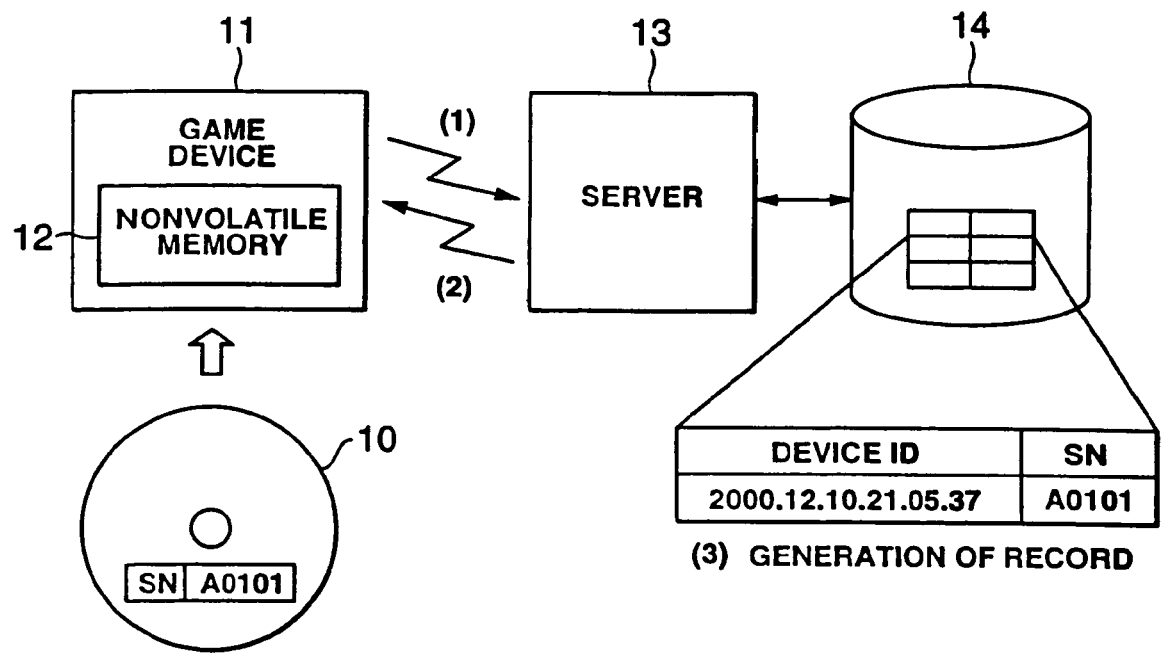
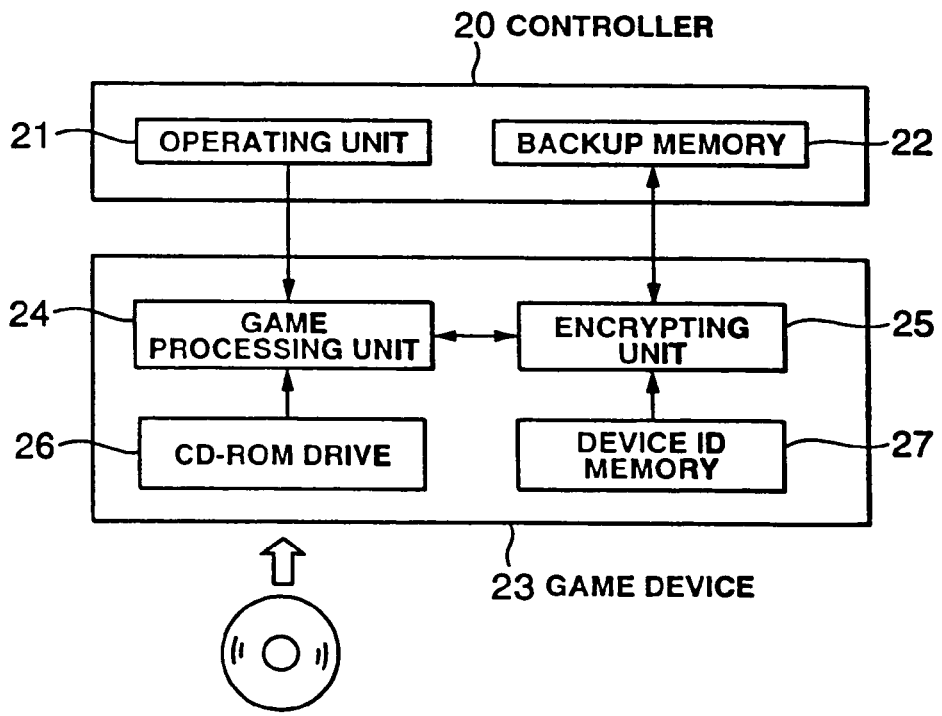

| MODE | REQUIRED LEVEL |
|---|---|
| BASIC | NONE |
| ADVANCED | NO LESS THAN 20 |
| EXPERT | NO LESS THAN 40 |

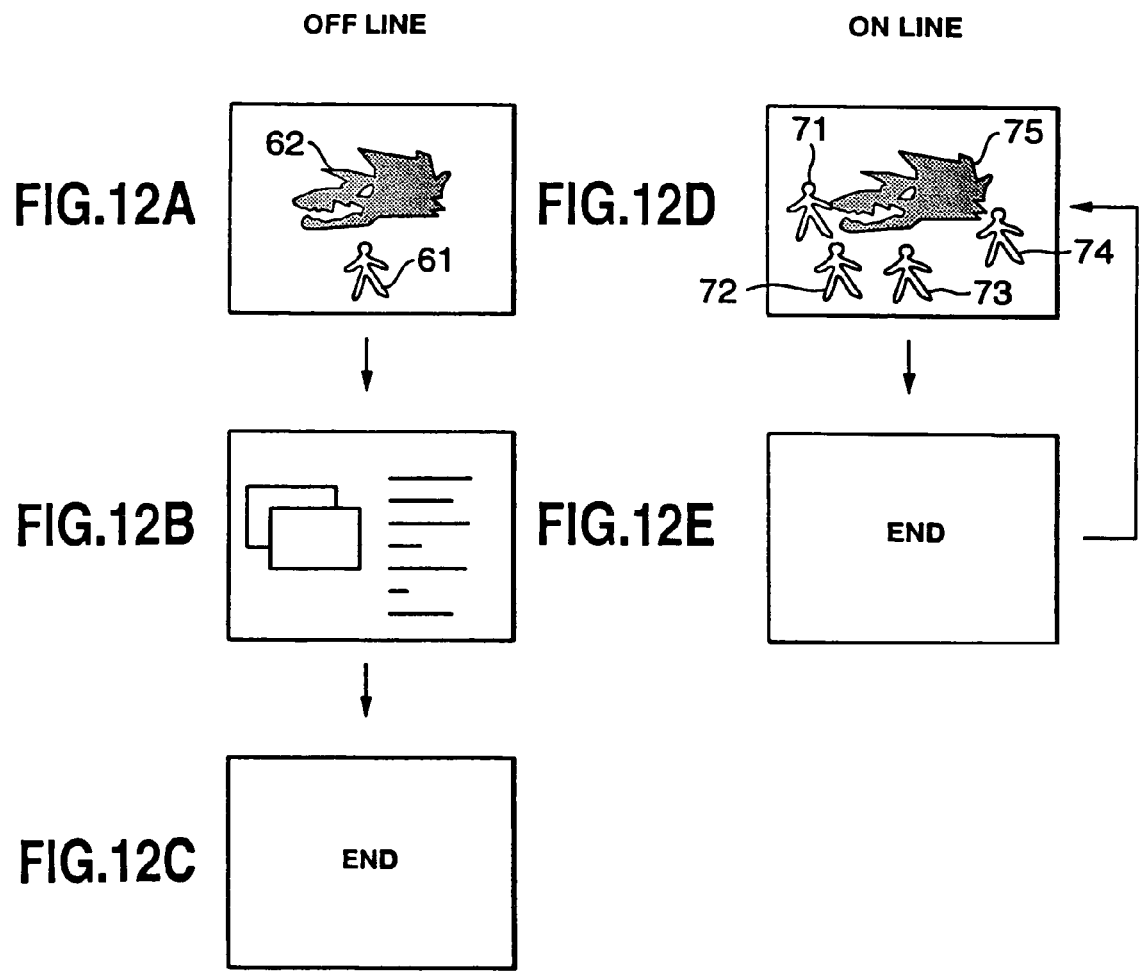

SECURITY SYSTEM

CROSS REFERENCES

This is a Divisional of application Ser. No. 10/021,027, filed Dec. 19, 2001, and is also based upon and claims the benefit of priority from the prior Japanese Patent Application No. 2000-387833, filed Dec. 20, 2000. The entire contents of both applications are incorporated herein by reference.

BACKGROUND OF THE INVENTION

1. Field of the Invention

The present invention relates to technology for security system, more particularly to a communication game system by connecting a plurality of game devices through a network.

2. Description of the Related Art

It has been suggested that a communication game system is realized by connecting a plurality of game devices to a communication network such as a telephone line, an ISDN network, etc. In such communication game system, the applicant suggested a security technology of a recording medium in Japanese Patent Laid-Open Publication No. 2000-35885 in order to prevent a third party from misusing a recording medium with game software stored therein.

The Publication describes the technology in which a server manages identifying information inherent in a recording medium with game software stored therein and identifying information inherent in a game device to understand which recording medium is used in each game device, whereby, when such game device is connected to a communication network, a limitation is imposed on game processing if such server judges that the recording medium attached to the game device was previously used in another game device, and ordinary game processing is performed if the server judges that such recording medium is being used only for the pertinent game device.

However, as identifying information inherent in a game device is not always pre-recorded in the phase of developing such game device, there is also a game device not having such identifying information.

Further, in communication games, a game play could be resumed from the status immediately before stopping play of the game last time by backing up data, such as the progression status of the game or various items which a player obtained, in a backup memory which is detachable from a game device body or an operation controller. However, as one's own data (e.g. items, etc.) could be provided to a third party by copying the contents of the backup memory, such third party could enjoy playing the game using another person's saved data. Thus, when the contents of a backup memory can easily be copied, the problem will arise that a player can not fully enjoy the game.

Such problem will also arise when a backup memory detachable from a game device body or an operation controller is attached to another person's game device or operation controller to play a game.

Furthermore, saved data which is backed up in a backup memory can be transferred from a game device to another game device through a communication network; however, if the saved data, upon transferring the saved data from the backup memory to the game device, remained in the backup memory, there is the possibility of misuse by providing saved data to another person while retaining the saved data in one's own backup memory by forcibly taking the backup memory from the game device.

Also, in conventional communication games, there was no limitation of the levels required to participate in a game. Accordingly, for example, when a beginner and a skilled player participate in a communication game, the beginner will reach the ending of the game by doing nothing but following the skilled player, which reduces the amusing aspect of the game.

Similarly, when, in a communication game in which a plurality of players participates, saved data concerning progression status of the game is backed up, a beginner will start the game in the middle of a skilled player's game by participating in the game with the skilled player. If the saved data concerning the progression status of the game is backed up in a beginner's backup memory, the next game will start in the middle of such game and a part of the game will become unable to be played, it, therefore, is not desirable.

Further, as long as a communication game is connected to a telephone line, the telephone bill is charged as a connection fee, and in addition, a fee for an Internet connection to the provider is also charged. Therefore, when it unnecessarily takes a long time at the ending part of the game, which does not require the operation by a player, the player is forced to be responsible for costly charges.

Here, an object of the present invention is to provide a computer readable recording medium in which a security system for preventing misuse by a third party of a recording medium, a data processing device, a recording medium management method and a program for performing such method are recorded. Another object of the present invention is to provide a computer readable recording medium in which a data processing device for preventing misuse of a backup memory, a data processing method, a security system, a method for managing saved data and a program for performing such method are recorded. Still another object of the present invention is to provide a computer readable recording medium in which a game server for enhancing an amusing aspect of a communication game, a game processing method and a program for performing such method are recorded.

SUMMARY OF THE INVENTION

To solve the aforementioned problems, in the present invention, identifying information inherent in a data processing device connected to a communication network is issued, the identifying information inherent in the data processing device and identifying information inherent in a recording medium in which data to be processed in the data processing device is recorded are associated with each other and stored, and in reference to such association, which data processing device is used in each recording medium is managed. As identifying information of a data processing device is issued by a server via a communication network, even though the data processing device does not have inherent identifying information in advance, security of the recording medium can be secured.

Further, the present invention can provide a computer readable recording medium in which a program for causing a computer system to perform the aforementioned method is recorded. Examples of computer readable recording media are: in addition to portable recording media such as optical disks (disks having an inherent physical format such as CD-ROM, DVD-ROM, DVD-RAM, DVD-R, PD Disk, MD Disk, MO Disk, etc.) and flexible disks, internal recording devices in a computer such as RAM or ROM, etc., or external recording devices such as a hard disk.

Furthermore, in the present invention, saved data in a backup memory is encrypted using identifying information inherent in the data processing device as a key. By this, the saved data in the backup memory can not be used in another data processing device, and therefore, misuse of the saved data can be prevented.

In the present invention, also, after saved data to be processed in a data processing device is transferred to a data processing device, the saved data stored in a nonvolatile memory within a backup memory is erased, which effectively prevents misuse of transferring saved data in a backup memory to another data processing device while retaining such data in the backup memory.

In the present invention, also, the number of times which a data processing device having a backup memory is connected to a communication network is registered in a database while such number of times is recorded in the backup memory or data processing device, and when such number of times, which is obtained from the data processing device upon the data processing device having a backup memory being connected to the communication network, is consistent with the number of times registered in the database, the processing of data in the backup memory is permitted. By this, illegitimate copy of the data in the backup memory can be effectively prevented.

In the present invention also, a level required to participate in a game is set in advance in accordance with the difficulty of the game and a player complying with the required level for the difficulty of the game is allowed to participate in the game. This can solve the aforementioned problem that a beginner proceeds through a communication game with help from a skilled player by participating in the game with the skilled player.

Further, in the present invention, progression status of a communication game is not backed up as saved data when such game is played via a communication network. Even in the case in which a game device backs up progression status of the game, it may be prohibited to start a game in the middle of the game in reference to such progression status when the game is played without connecting to a communication network. This can solve the aforementioned problem.

Furthermore, in the present invention, the displaying time of an ending screen of a communication game, when such game is played via a communication network, is shortened. This can reduce an increase in a fee for a connection to a communication network and a fee for an Internet connection to a game server.

BRIEF DESCRIPTION OF THE DRAWINGS

FIG. 1 is an illustration of a security system of a recording medium.

FIG. 2 is an illustration of a game device and a controller.

FIGS. 12A, 12B, 12C, 12D and 12E is an illustration of ending screens of a game.

DESCRIPTION OF THE PREFERRED EMBODIMENT

Embodiment 1

Figure 3:
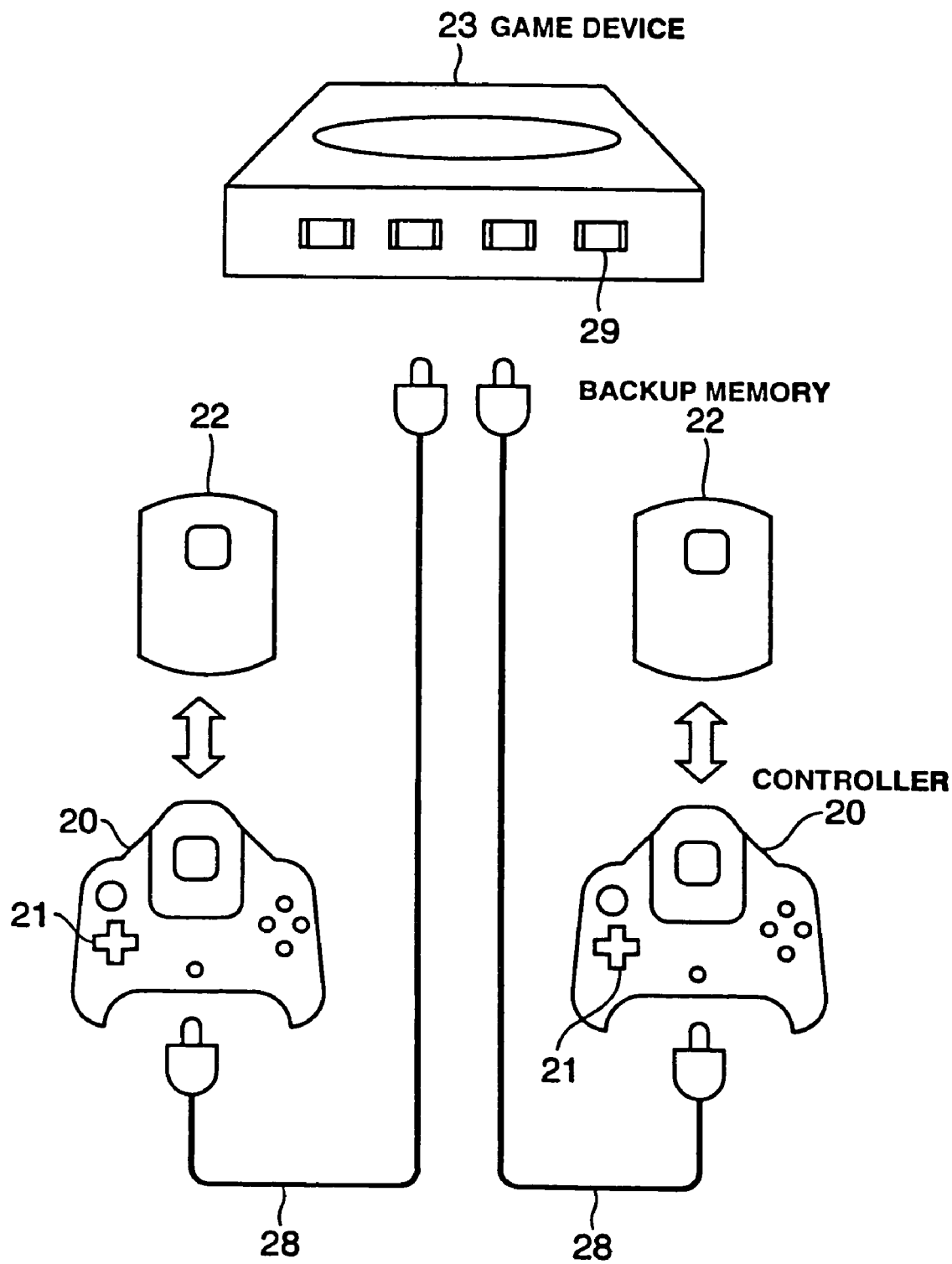
FIG. 3 is an illustration of an exterior view of a game device and a controller.

FIG. 1 is an illustration of a server, which prevents misuse by a third party of a recording medium, and a game device. In the Figure, numeral 10 is a portable recording medium such as a CD-ROM with game software stored therein, and numeral 11 is a home game device. The game device 11 comprises desired communication functions so as to read a game program recorded in the recording medium 10 and play a communication game together with another game device through a communication network such as a public circuit (e.g. telephone line, ISDN network, etc.) or an exclusive circuit. A server 13 manages the communication game processing, etc. of each game device connected to the communication network.

In the recording medium 10, identifying information inherent in each recording medium, which is called a "serial number (SN)" is provided. In the example of FIG. 1, the SN of the recording medium is A0101. The SN may be the one recorded in the recording medium 10 as data or the one indicated in its package or manual. When the game device 11 accesses the server 13 through a communication network (FIG. 1 (1)), the server 13 requires the game device 11 to transfer the device ID of the game device 11 and the SN of the recording medium 10. The device ID is identifying information allocated to each game device so it does not overlap with others and is issued from the server 13.

When the game device 11 first accesses the server 13, the server 13 issues a device ID to the game device 11 as it did not yet issue the device ID to the game device 11 (FIG. 2 (2)). As a device ID, the time of the game server 11 accessing the server can be used. The time includes the year, month, day, hour, minute and second. When the time and the date of access is Dec. 10, 2000 and 21:05:37, for example, the device ID is 2000.12.10.21.05.37. The game device 11 stores the device ID issued from the server 13 on a nonvolatile memory 12 such as a flash memory. Further, the data encrypted by time and date may be stored in the nonvolatile memory 12 as a device ID.

In a database 14, the SN of a recording medium used in the game device using the device ID as a key is associated and managed in each record. The server 13 generates a record in which the device ID issued to the game device 11 (2000.12.10.21.05.37) and the SN (A0101) are associated with each other (FIG. 1 (3)).

By the aforementioned structure, the server 13 associates the device ID of the game device 11 and the SN of the recording medium 10 with each other and manages them. Therefore, if a third party attempts to insert a recording medium used in another game device into its own game device and use it, the SN of the recording medium and the device ID of the game device are not consistent with each other, and therefore, the server 13 can impose a limitation on the use by such third party of the recording medium.

Further, considering that there is almost no possibility that no less than two players simultaneously access the server, including the same second, upon using as a device ID the time and date (at the same second) for accessing the server 13, a device ID inherent in each game device can be practically allocated to each game device. Of course not only can the time and date of the game device accessing the server be used as a device ID, but also an ID provided in advance to avoid an overlap can be used as a device ID.

Furthermore, in the above explanation, although a CD-ROM is referred to as an example of a recording medium, it does not limit it, as optical disks (e.g. DVD-ROM, DVD-RAM, DVD-R, PD Disk, MD Disk, MO disk, etc.), a flexible disk (FD), a detachable cartridge in which a game program is stored, a memory card, etc. can also be used.

Embodiment 2

FIG. 3 is an illustration of a game device and an operation controller. In an operation controller 20, a backup memory 22 for saving saved data is detachable and an operating unit 21, on which an analog key or switches are arranged, is provided. The backup memory 22 includes a nonvolatile memory. The operation controller 20 is connected to a game device 23 via a connection cord 28 and a connector 29. Further, the backup memory 22 may be attached to the game device so as to be directly and freely detachable therefrom.

FIG. 2 is a functional block diagram of a game device and an operation controller. A game device 23 comprises a game processing unit 24, an encrypting unit 25, a CD-ROM drive 26 and a device ID memory 27. These modules are realized by hardware, such as a CPU, a ROM, a RAM, etc. In the game processing unit 24, a game program to be supplied from a CD-ROM via the CD-ROM drive 26 is read and a game program is executed based on a control signal of the analog key or switches which is outputted from the operating unit 21, and saved data to be backed up in the backup memory 22 is generated.

When a player directs the game device 23 to back up saved data in the backup memory 22, or directs the game device 23 for a game program to back up saved data in the course of program processing, the encrypting unit 25 encrypts the saved data using, as a key, information inherent in the game device 23 stored in the device ID memory 27 (e.g. production number), and backs up such data in the backup memory 22. For encryption, a known encryption technology can be used. Meanwhile, when the game device 23 reads the saved data backed up in the backup memory 22, the saved data is decrypted in the encrypting unit 25 using the device ID as a key, and is outputted into the game processing unit 24.

By the above structure, the data saved in the backup memory 22 is encrypted using the information inherent in the game device 23 as a key, and therefore, such data can not be used in another game device. Accordingly, misuse of a backup memory, such as playing a game in one's own game device using another's backup memory, can be effectively prevented.

Embodiment 3

Figure 4:
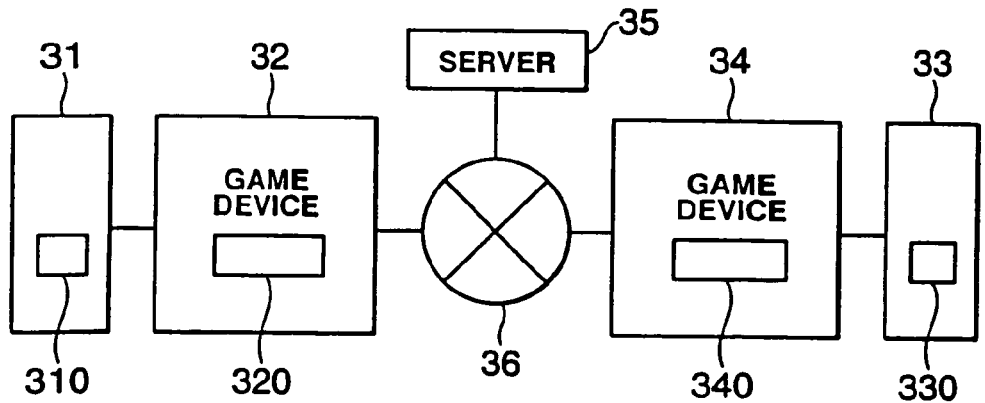
FIG. 4 is an illustration showing a structure of a connection between game devices and a communication network.

FIG. 4 is an illustration of the case in which a plurality of game devices is connected to a communication network to play a game. In the Figure, numerals 32 and 34 are home game devices, and numeral 35 is a server for controlling a communication game. Numeral 36 is a communication network such as a public circuit. An operation controller 31, which comprises a backup memory 310 for backing up saved data, is connected to the game device 32. Likewise, an operation controller 33, which comprises a backup memory 330, is also connected to a game device 34. For a communication protocol in the communication network 36, TCP/IP, which is suitable for an open network, is used.

The game device 32 timely writes in a ROM 320 an item obtained by a player, the score, progression status of a game, etc. along with the progression of the game. The data written in the RAM 320 can be transferred to the backup memory 310 as saved data. Further, the items, etc. obtained by the player can be transferred to a RAM 340 of the game device 34 via the communication network 36.

Figure 5:
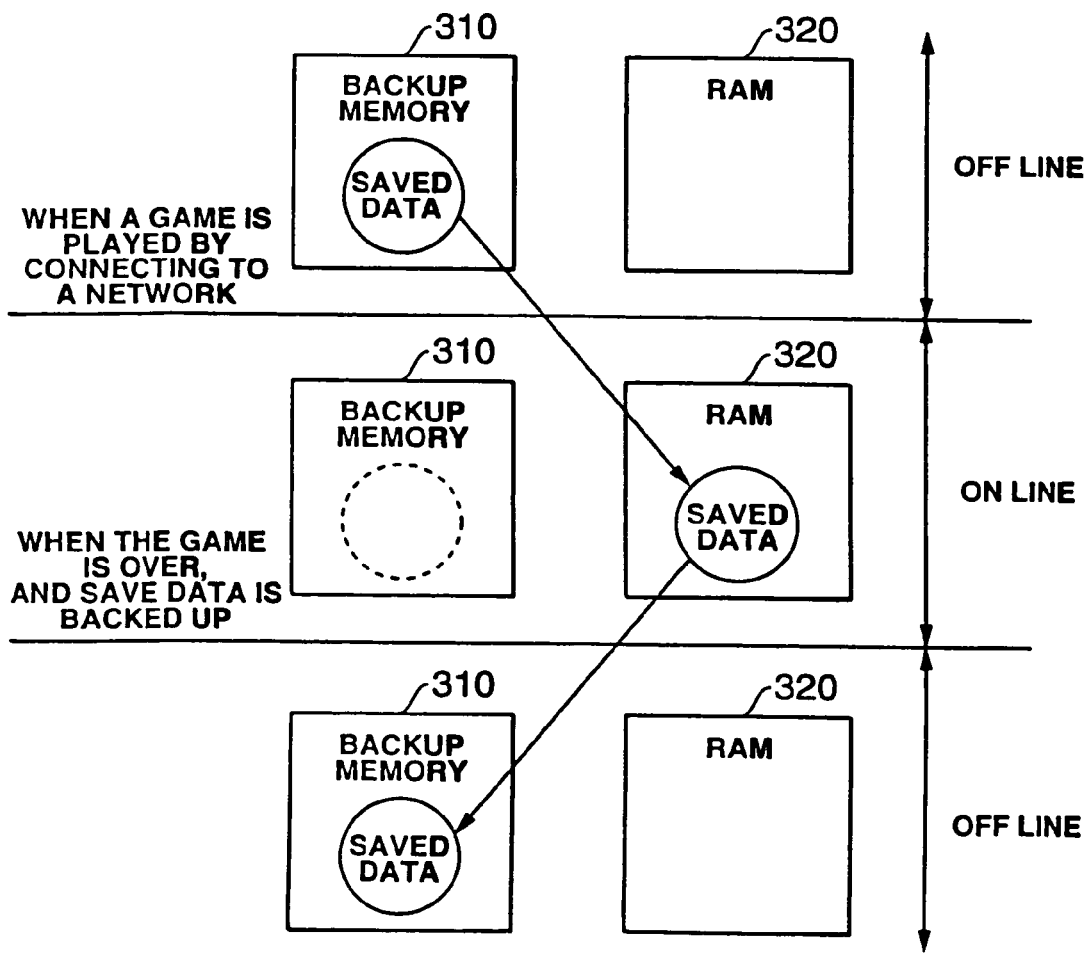
FIG. 5 is an illustration showing a transfer of saved data.

FIG. 5 is an illustration showing status of a backup memory when a communication game is played using saved data backed up in the backup memory. In the backup memory 310, saved data such as items is backed up. When the game device 23 is connected to a network, the saved data in the backup memory 310 is transferred (moved) to the RAM 320 of the game device 23, and the saved data in the backup memory 310 is erased. Thus, while the game device 23 is connected to the communication network 36, the saved data in the backup memory 310 is vacant. At the time of ending the game, when the saved data in the RAM 320 is backed up in the backup memory 310, the saved data is transferred from the RAM 320 to the backup memory 310.

Conventionally, when the saved data in the backup memory 310 is transferred to the RAM 320, the saved data is copied to be transferred; therefore, the saved data is also backed up in the backup memory 310 even after the saved data is transferred to the RAM 320. As a result, even in the case that a player provides another player with a part of or the whole parameters in the saved data, by forcibly taking the backup memory 310 from the operation controller 31 thereafter, the saved data provided to such other player can be backed up in the player's own backup memory 310.

According to this embodiment, however, the saved data in the backup memory 310 is not copied to the RAM 320, but transferred to the RAM 320, which can effectively prevent misuse of the backup memory as described above.

Embodiment 4

Figure 6:
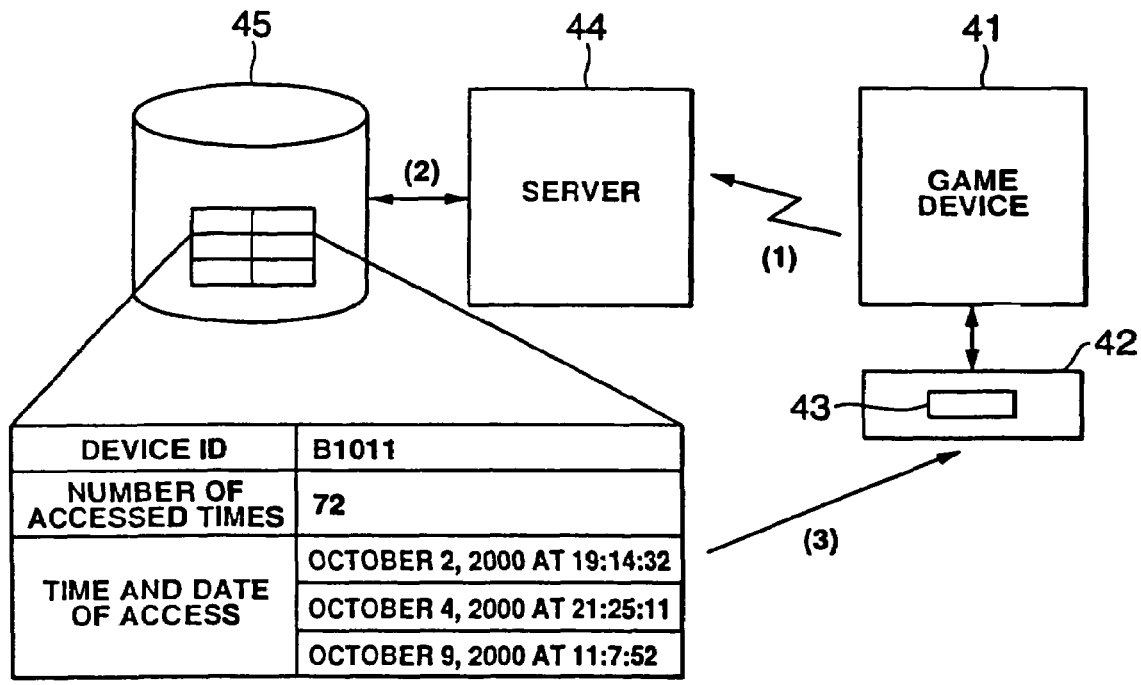
FIG. 6 is an illustration of a security system for a backup memory.

FIG. 6 is an illustration of a server, which controls a communication game and a game device. In the Figure, numeral 41 is a home game device, by which a game can be played by accessing a server 44. The game device 41 develops a game based on an operation signal supplied from an operation controller 42. The controller 42 comprises a backup memory 43 for backing up saved data. The backup memory 43 comprises a nonvolatile memory.

The server 44 comprises a database 45 and records by record the number of access times and the time and date of access (hereinafter referred to as the "Access Information") using its device ID as a key. The device ID is information inherent in the game device 41, e.g. the production number, the time (including the second) and date when the game device 41 is first connected to a network, etc. In the example of FIG. 6, the device ID of the game device 41 is B1011, the number of access times is 72, the time and date of access is Oct. 2, 2000, 19:14:32, Oct. 4, 2000, 21:25:11, Oct. 9, 2000, 11:07:52. While the Access Information of the game device 41 is registered in the database 45, the same content of such information is also written in the backup memory 43.

In FIG. 6, when the game device 41 accesses the server 44 via a communication network (FIG. 6 (1)), the server 44 obtains from the game device 41 the device ID and the Access Information in the backup memory 43. Then, in reference to the database 45 (FIG. 6(2)), the consistency of the device ID and the Access Information is checked. Considering that there is almost no possibility that a plurality of game devices access the server at the same time and date including the same second, the Access Information can be considered inherent in the backup memory 43. Therefore, the Access Information of the game device functions as identifying information for distinguishing the backup memory 43 from another backup memory.

When the device ID and the Access Information are consistent with each other, the server 44 increments the number of access times by one and updates the records by adding and recording such time and date of access. Simultaneously, the information of the backup memory 43 is also updated (FIG. 6(3)). Meanwhile, when the device ID and the Access Information are not consistent with each other, there is a doubt raised of misuse of the backup memory 43, and therefore, the use of the backup memory is restricted.

The inconsistency of the device ID and the Access Information refers to ① the case of attempting to back up saved data in another person's backup memory and to use such data, and ② the case of there being a doubt raised of illegitimately copying the saved data. In the case of ①, the device ID and the number of access times, and the time and date of access are completely inconsistent with each other. Therefore, it is obviously an attempt to use another's saved data not used in the game device 41. In the case of ②, the saved data is the one used in the game device 41, the access time and date is partly consistent, but there is a doubt raised of illegitimate copying because of the inconsistency of the number of access times.

Figure 7:
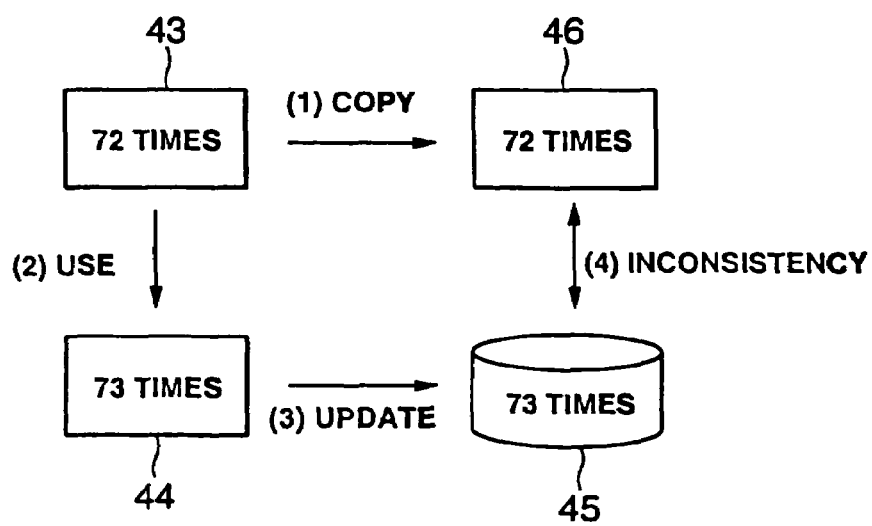
FIG. 7 is an illustration of prevention of an illegitimate copy of a backup memory.

The case of ② is explained in detail in reference to FIG. 7. As shown in the Figure, the saved data backed up in the backup memory 43 is illegitimately copied in a backup memory 46 (FIG. 7 (1)). If the number of access times recorded in the backup memory 43 is 72, the number of access times recorded in the backup memory 46 also becomes 72. Here, when a player uses the backup memory 43, such number of access times recorded in the backup memory 43 is updated to be 73 (FIG. 7(2)). Further, the record in the database 45 is also updated to be 73 (FIG. 7 (3)). Here, when the player takes the backup memory 43 from the controller 42 and newly attaches the backup memory 46 and accesses the server 44, it becomes clear that there is a doubt raised of illegitimate copying as the number of access times in the backup memory 46 and that recorded in the database 45 are different (FIG. 7 (4)). Further, the same is the case of using the same backup memory, such as the case of copying in advance saved data in another recording medium, then playing a game, and updating saved data and setting such saved data back again to the one before such update and then playing a game.

As described above, according to this embodiment, the server 44 manages the device ID and the Access Information of the game device 41, and therefore, misuse of the backup memory 43 and an illegitimate copy can be effectively prevented by cross-checking the device ID and the Access Information.

Embodiment 5

Figures 8, 9:
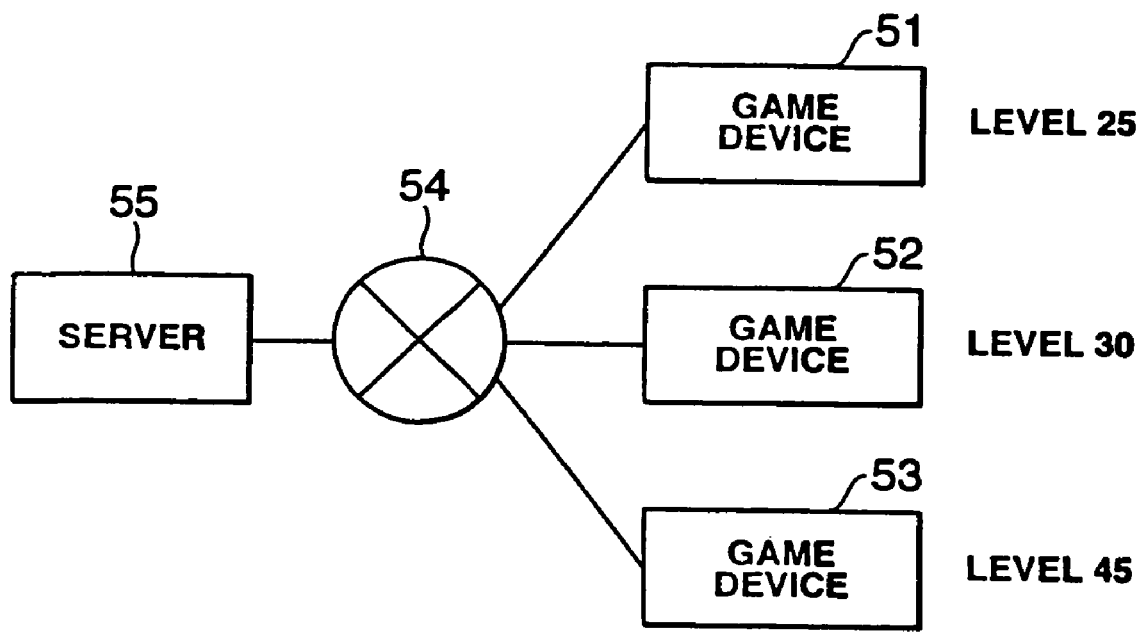
FIG. 8 is an illustration of a communication game.
FIG. 9 is an illustration of levels required to participate in a communication game.

FIG. 8 is an illustration of the case of playing a communication game by connecting a plurality of game devices to a communication network. In the Figure, numerals 51 to 53 are game devices connected to a communication network 54 and numeral 55 is a server for controlling a communication game. In this embodiment, as shown in FIG. 9, a level required to participate in a communication game is set in accordance with the level of the game. For instance, at the basic level, everyone can participate in the game; however, at the advanced level, a level of no less than 20 is required to participate in the game, and at the expert level, a level of no less than 40 is required to participate in the game. The "level" referred to here means a parameter to be given to a player's character as the game proceeds, which is mainly given in accordance with the kind and number of enemy characters which the player's character defeated during the game.

FIG. 8 shows the level of each player in the case of playing a communication game of high level. The level of a player for a game device 51 is 25, that for a game device 52 is 30 and that for a game device 53 is 45; therefore, the communication game of high level can be played by these three players.

Conventionally, when such communication game is played by a plurality of players, a player can participate in the game regardless of his/her level. Therefore, for instance, a skilled player who is familiar with communication games and a beginner who has just started to play communication games can play a game together, and the beginner would be able to reach the ending of the game by following the skilled player. If voluntary participation in a communication game regardless of the levels is allowed, the amusing aspect of the game may be reduced. According to this embodiment, however, the level of a player who is allowed to participate in a communication game is set in accordance with the level of the game, which can solve the aforementioned problem.

Figure 10:
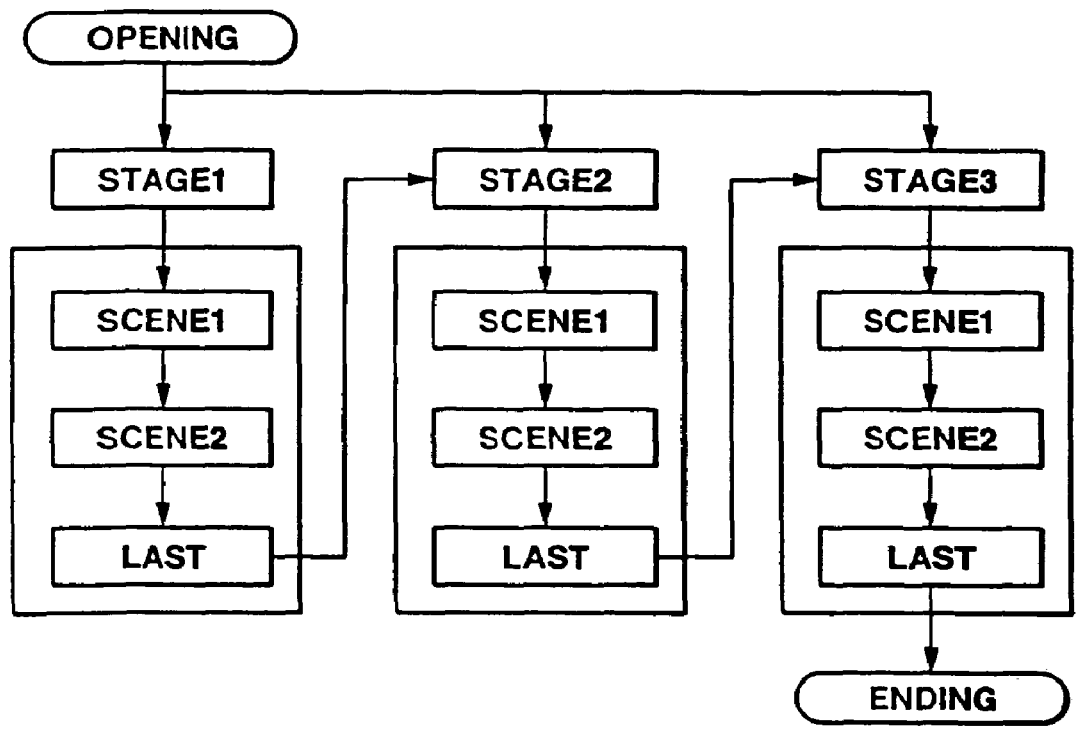
FIG. 10 is an illustration of a plot of a game development.

FIG. 10 is an illustration showing a plot of a game development. As shown in the Figure, the game consists of stages 1 to 3. The stages consist of the scenes such as a forest area, an underground cave, a dig and an ancient space ship. In each such stage, a scene 1 and a scene 2 are set in line with the proceeding of the game, which provides variation to the development of the scenes. Each stage has a final scene and a player can proceed to the next stage by defeating an enemy character appearing in the scene.

When a player plays a game off line without connecting to a communication network, generally, progression status of the game is backed up as flag data in preparation for the next game play. However, upon playing a game on line via a communication network, a plurality of players' characters develop the game, and therefore, for instance, even though a beginner does nothing, such beginner can proceed through the game only by following a high-level player.

Figure 11:
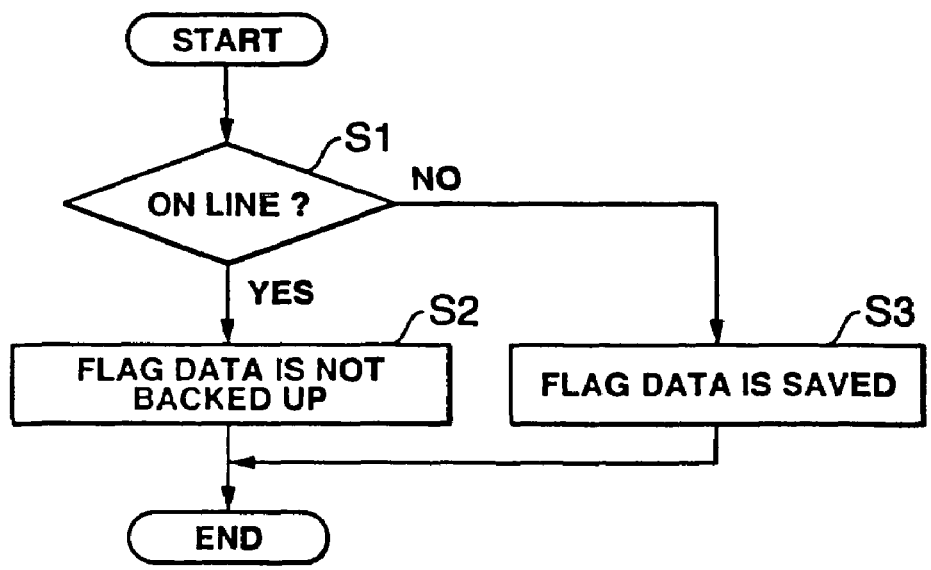
FIG. 11 is a flowchart relating to backing-up of flag data showing progression status of a game.

As a result, in this embodiment, as shown in FIG. 11, upon playing a game on line (Step S1; YES), flag data showing progression status of the game is not backed up (Step S2), and upon not playing a game on line (Step S1; NO), flag data showing progression status of the game is backed up (Step S3). By such structure, the aforementioned problem can be solved. Further, even if the case in which the game device stores flag data showing progression status of the game, it may be prohibited for a player to play a game in the middle thereof in reference to the flag data when the game is played without connecting to a communication network.

Further, as means for controlling the back-up of flag data showing progression status of a communication game, back-up controlling means may be provided for the game device, and the back-up of flag data showing the progression status of the game may be controlled by the game server.

Embodiment 7

FIG. 12 shows changes of ending screens of a game. In the Figure, FIGS. 12A to 12C are diagrams of changes of ending screens when a player plays a game off without connecting to a communication network, and then ends the game. When a player character 61 defeats an enemy character 62 and ends the game (FIG. 12A), the credits are run for several minutes (FIG. 12B), and the "END" screen is displayed (FIG. 12C).

Meanwhile, FIGS. 12C and 12D are diagrams of changes of ending screens when a plurality of players play a game on line via a communication network and then end the game.

When players' characters 71 to 74 defeat an enemy character 72 and end the game (FIG. 12C), the "END" screen is promptly displayed (FIG. 12D), and then returned to the initial screen (FIG. 12C).

Thus, when a player plays a communication game on line, as long as the game is connected, a fee for an Internet connection to a server is charged in addition to a fee for a connection to a telephone line. Therefore, by shortening the time of the ending screens of the game, the player's costs can be reduced.

Furthermore, in the case of a communication game, as means for controlling the shortening of the displaying time of the ending screens of the game, such controlling means may be provided for the game device, the displaying time of the ending screens may be shortened by a game server.

According to the present invention, identifying information is issued from a server to a data processing device via a communication network. Therefore, even if no identifying information is provided to a data processing device in advance, it is possible to manage which recording medium is used in which data processing device.

According to the present invention, saved data in a backup memory can be encrypted and decrypted using, as a key, identifying information inherent in a data processing device, which is effective for protecting the security of the saved data.

According to the present invention, saved data backed up in a nonvolatile memory of a backup memory is erased after the saved data to be processed to a data processing is transferred to the data processing device, which can effectively prevent misuse of saved data.

According to the present invention, a server manages the number of times that a data processing device having a backup memory is connected to a communication network, which can effectively prevent misuse of the saved data in the backup memory.

According to the present invention, a level required to participate in a communication game is set in advance in accordance with the difficulty of the gate, a player complying with the level required in accordance with the difficulty of the game is allowed to participate in the communication game, which enables the communication game to be more amusing.

According to the present invention, progression status of a game is not backed up as saved data when the game is played via a communication network, which enables the communication game to be more amusing.

According to the present invention, the displaying time of ending screens of a communication game is shortened when the game is played via a communication network, which can reduce the burden of a connection fee to a communication network.

The invention may be embodied in other specific forms without departing from the spirit or essential characteristics thereof. The present embodiment is therefore to be considered in all respect as illustrative and not restrictive, the scope of the invention being indicated by the appended claims rather than by the forgoing description and all changes which come within the meaning and range of equivalency of the claims are therefore intended to be embraced therein.

What is claimed is:

1. An information processing device comprising:
    an information processing means provided with a memory region and arranged to allow a player to perform a game by executing a game program installed from a storage medium in response to operations by the player; and
    an interface to which a removable memory medium, which is provided separately from said memory region and said storage medium, is removably mountable;
    said information processing means being configured with functions of:
    (a) storing, on finishing the game, said memory medium mounted to said interface with performance data which is indicative of the latest game status of the game archived by the player on said information processing device and encrypted using identification information inherent to said information processing device as a key;
    (b) moving said performance data stored at function (a), from the removable memory medium into the memory region and erasing the performance data from the removable memory medium when said removable memory medium is mounted to the interface on resuming the game on the information processing device;
    (c) decrypting said encrypted data moved from said memory medium using said identifying information as a key;
    (d) allowing the player to resume the game using the performance data as decrypted at function (c); and
    (e) updating the performance data stored on the memory region in accordance with progresses of the game, and
    (f) on finishing the resumed game, encrypting said performance data updated in accordance with progress of the game at function (e) using said identification information inherent to said information processing device as a key; and
    moving the updated and encrypted performance data to a removable memory medium from said memory region so that the updated performance data is erased from the memory region.

2. A security system which manages online games between information processing devices each provided with an information processing means configured to perform the online game by executing a game program stored in a storage medium; an interface to which a removable memory medium, which is provided separately from said storage medium, is removably mountable; and a connection means configured to be connectable to a server via a communication network,
    wherein said server comprises a database on which, with respect to each of the information processing devices, a number of times that the information processing device has been connected to the server via the communication network, is stored, said security system being configured to execute the processes of:
    (a) causing the server to count and store in the database, with respect to each of said information processing devices, a number of times that the information processing device has been connected to the server via a communication network, when the information processing device is connected to the server;
    (b) on finishing the online game, causing the information processing device to store, in association with the number of times that the information processing device has been connected to the server, the performance data indicative of the latest status data archived by the player on the information processing device in the removable memory medium;
    (c) causing, on resuming the online game, the information processing device to move the data including the performance data and the number of times from the removable memory medium into the information processing device and to erase the data from said removable memory medium when the data is moved into a memory region on the information processing device;
    (d) causing, on resuming the online game, the information processing device to send the data of the number of times, which is moved from the removable memory medium at process (c), to the server;

(e) comparing said number of times obtained from said information processing device with the number of times registered in said database;

(f) permitting the player to resume the online game on said information processing device using the performance data moved from the removable medium with the number of times, if the number of times obtained from said information processing device agrees with the number of times stored in said databases; and (g) causing the server to transmit an updated number of times to said information processing device thereby allowing the information processing device to execute, on finishing the resumed online game, the process of storing updated performance data with said number of times in said removable memory medium; or (h) restricting said information processing device to process the performance data in said removable memory medium, if the number of times obtained from said information processing device does not agree with the number of times registered in said database.

3. A method for managing online games played between information processing devices connected to a server provided with a database via a communication network, wherein each of said information processing devices comprises an information processing means which executes a game program to allow a player to perform the online game, and an interface to which a removable memory medium, which is provided separately from a storage medium stored with the game program, is removably mountable, the method comprising the steps of:

(a) causing the server to count and store in the database with respect to each of said information processing devices, a number of times that the information processing device has been connected to the server via a communication network when the information processing device is connected to the server;

(b) causing, on finishing the online game, the information processing device to store in the removable memory medium performance data, which is indicative of the latest status of the online game performed by the player, in association with the number of times counted at step (a);

(c) causing, on resuming the online game, the information processing device to transmit to the server the data of the number of times read from the removable memory medium in which the performance data was stored in association with the number of times at step (b);

(d) causing the server to compare the number of times transmitted at step (c) from the information processing device with the number of times registered on said database, while the information processing device is connected to the server via a communication network;

(e) permitting the player to resume the online game on the information processing device using the performance data stored at step (b) when said number of times obtained from said information processing device is consistent with the number of times registered in said databases; and (f) causing the server to count an updated number of times and transmit it to said information processing device thereby allowing the information processing device, on finishing the online game, to execute the step of storing updated performance data performed during the resumed online game in association with the updated data of said number of times on a removable memory medium; or (h) restricting said information processing device to process the performance data in said removable memory medium, when the number of times obtained from said information processing device does not agree with the number of times registered in said database.

4. A game device comprising:

a game control means provided with a memory region and arranged to allow a player to perform an online game by executing a game program installed from a first storage medium in response to operations by the player while the game device is connected to another game device via a network;

an input/output interface to which a second storage medium, which is provided separately from said memory region and said first storage medium, is removably mountable; and a communication means arranged to connect the game device with another game device via the network, said game control means being configured with functions of:

(a) on finishing the online game, storing performance information, which is indicative of the latest game status of the online game archived by the player on said game device, in said second storage medium mounted to said interface in association with the performance information with identification information provided to said game device;

(b) when said second storage medium is mounted to the interface on resuming the online game on said game device, moving said performance information with the identification to the memory region from said second storage medium and erasing the performance information from said second storage medium;

(c) allowing the player to resume the online game using the information moved into said memory region from said second storage medium if the identification information moved into the memory region at function (b) agrees with the identification information provided to said game device, while such performance information as stored at function (a) is erased at function (b) from said second storage medium;

(d) updating the performance information stored on the memory region in accordance with progresses of the online game; and (e) on finishing the resumed game, moving the updated performance information in the second storage medium in association with identification information provided to said game device and erasing the updated performance information from said memory region; or (f) restricting said game device to process the performance data in said second storage medium, if the identification information moved into the memory region at (b) does not agree with the identification information provided to said game device.

5. A method for managing an online game played between information processing devices connected via a communication network, wherein each of said information processing devices comprises an information processing means configured to allow a player to perform the online game by executing a game program and an interface to which a removable memory medium is removably mountable, said method comprising processes, on each of said information processing devices, of:

(a) on finishing the online game on the information processing device, storing performance information, which is indicative of the latest game status of the online game archived by the player on said information processing devices, in the removable memory medium in association with identification information provided to said information processing device;

(b) moving said performance information with the identification information into the memory region from said removable memory medium and erasing the performance information from said removable memory medium when the removable memory medium is mounted to the interface upon resuming the online game on said information processing device;

(c) allowing the player to resume the online game from a game status reflecting the latest game status of the game moved into said memory region from said removable memory medium, if the identification information moved into the memory region at process (b) agrees with the identification information provided to the information processing device;

(d) updating the performance information stored on the memory region in accordance with progresses of the game; and (e) on finishing the resumed game, moving the updated performance information to the removable memory medium with the identification information provided to said information processing device and erasing the updated performance information from said memory region; or (f) restricting said information processing device to process the performance data in the removable memory medium, if the identification information moved into the memory region at process (b) does not agree with the identification information provided to said information processing device.

* * * * *